United States Patent
Mentink

[11] 3,719,199
[45] March 6, 1973

[54] SPOOL VALVE CONSTRUCTION OF MODULAR PARTS

[75] Inventor: John P. Mentink, Longmeadow, Mass.

[73] Assignee: Hydromation Systems Inc., Westfield, Mass.

[22] Filed: Oct. 1, 1971

[21] Appl. No.: 185,530

[52] U.S. Cl............................137/269, 137/625.69
[51] Int. Cl..............................................F16k 11/00
[58] Field of Search......137/269, 625.27, 625.5, 271, 137/625.69; 251/367

[56]  References Cited

UNITED STATES PATENTS

| | | | |
|---|---|---|---|
| 2,989,989 | 6/1961 | Whaley et al | 137/625.69 |
| 3,199,540 | 8/1965 | Forster | 137/625.69 |
| 3,202,170 | 8/1965 | Holbrook | 137/269 |
| 3,680,596 | 8/1972 | Pickett | 137/625.69 |

*Primary Examiner*—Henry T. Klinksiek
*Assistant Examiner*—Robert J. Miller
*Attorney*—Alonzo L. Neal et al.

[57] ABSTRACT

A modular spool valve construction having a plurality of identical body members assembled end to end between cap members and housing a spool element. Each body member is formed with a longitudinal passage having aligned spool seating portions at each end thereof and a central chamber, the latter having a lateral passage between the chamber and an outside wall surface for conduit connection. The end faces of the members are provided with complementary surfaces formed with aligned means concentrically of the spool seating portions for a piloted nesting together of a series of body members and a pocketing between adjacent members of a flexible ring seal. Longitudinal tiebolt corner openings are spaced at 90° for selecting the lateral direction of the connector passage of each chamber in assembling the parts.

6 Claims, 6 Drawing Figures

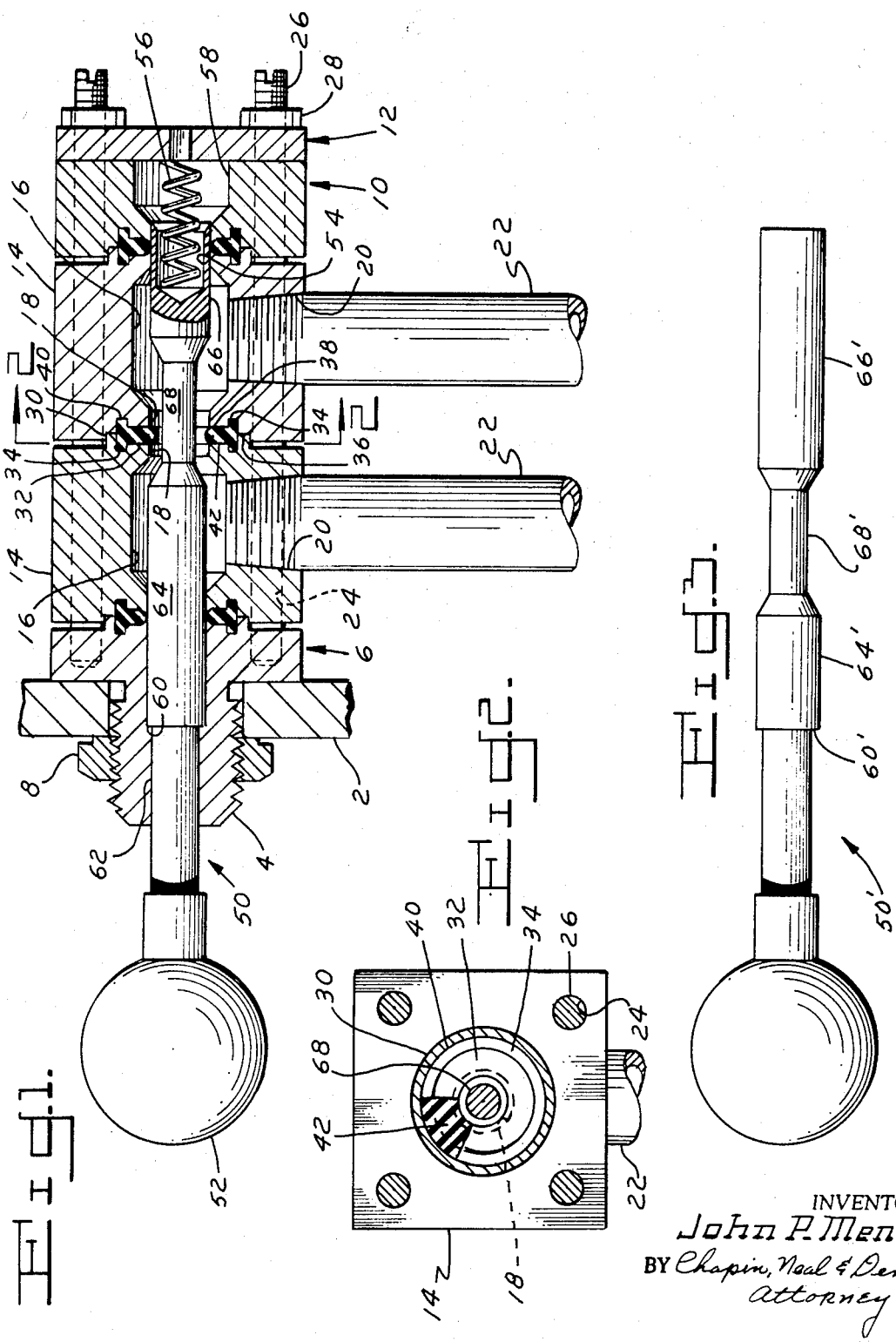

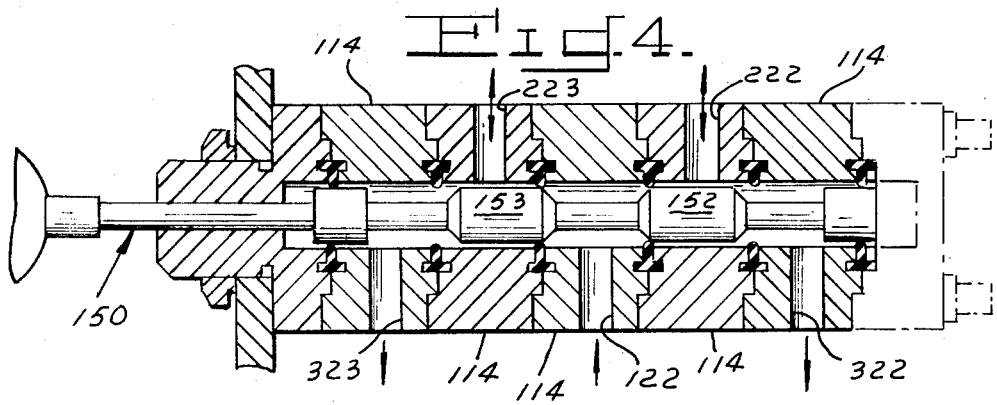
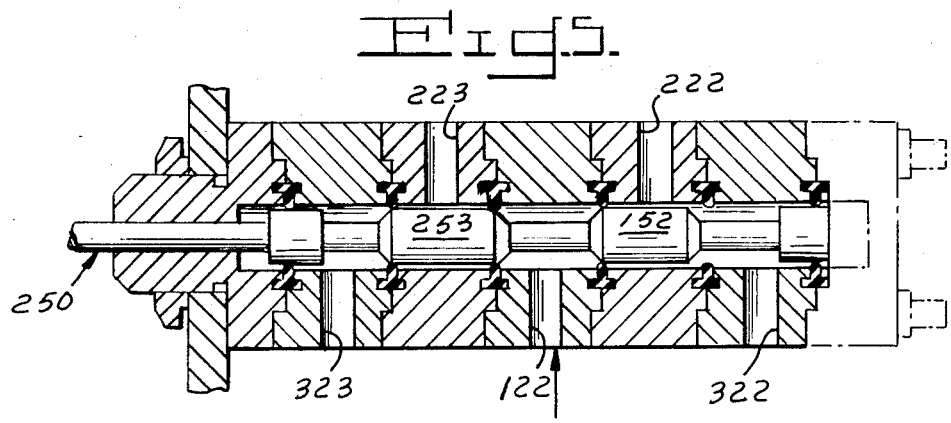
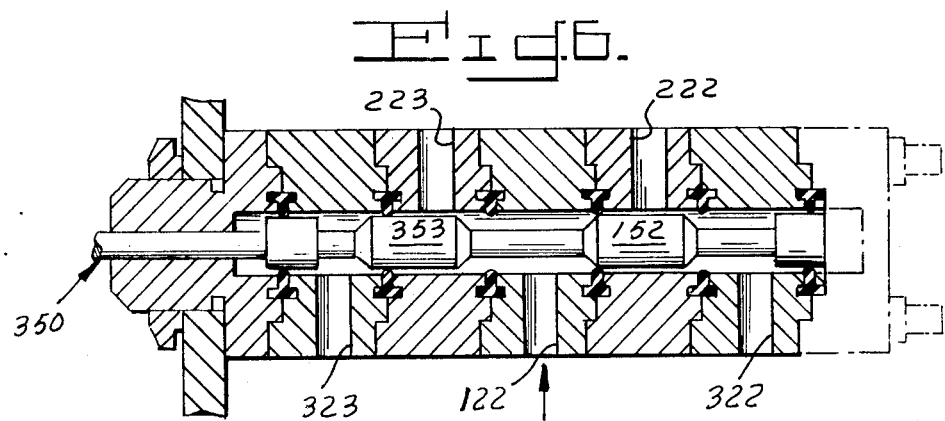

3,719,199

SPOOL VALVE CONSTRUCTION OF MODULAR PARTS

BACKGROUND

This invention relates to spool valve assemblies and particularly to an improved construction of modular parts therefor to enable the convenient and easy build-up of a variety of multi-way valve units as may be required for high pressure pneumatic and hydraulic systems. The present design of modular parts is suitable for valves of various sizes. It is especially adapted for miniatured units where such sizes may be an important factor as in fluid control circuitry for automated systems.

Insofar as is known, prior designs of modular valve constructions have not been suitable in all respects for use in high pressure systems operating at ranges of 5000 up to 10,000 psi, for example. The present design requires only small forces to operate, even under high pressure conditions, so that such valves may be used in hydraulic systems directly and without using pressurized control means. The nearest prior art known is that disclosed by U.S. Pat. No. 3,202,170 for poppet-type valves for pneumatic logic control circuitry and operation where the pressures involved are on the order of 100 psi or less.

A principal object of the present invention is the provision of a spool valve of a specifically novel modular construction in which axially balanced conditions are present and highly pressurized fluid, working on equal areas, enables operation of a valve with small forces only. Other objects are to provide a modular valve design having superior flow characteristics by virtue of annular flow passages and capable of handling a relatively large flow before encountering turbulence; to provide a design creating a relatively low pressure drop across the valve; to provide for an interfitting "pilot" or nesting connection between modular parts in order to assemble the same manually and without the need of special fixtures for insuring concentricity of parts; to provide a leak-proof sealed joint connection between modular members; and to allow for a fair degree of manufacturing tolerances without sacrificing proper valve seating operations.

The present invention as will be apparent further provides advantages in reducing inventory costs for the manufacturer, dealer, and user and allows quick changes in a given valve operation as may be needed.

SUMMARY

For the above purposes, modular valve body members as herein disclosed are provided in the form of square block-like component parts having a longitudinal passage with aligned cylindrical bores at each end and a central chamber therebetween, the latter having a conduit connector passage extending laterally to an outer side wall. At each end face the blocks are formed with annular recessed areas in which aligned grooves are cut concentrically of the bore openings. On one of the faces outwardly of the groove an annular flange or "piloting" rim projects in concentric relation with the groove and bore. On the other face a stepped shouldered recess is provided in which the piloting rim of other modular block members is received for nesting blocks together and automatically establishing a required concentricity of parts in end to end relationship. A flexible ring seal, T-shaped in cross section, is held between the opposed faces, the ends of the cross bar of the T being seated in the opposed grooves and the leg portion extending between the recessed areas and annularly extending around the joint between bore openings to provide a fluid-tight seal in the general manner of an O-ring. A suitable one-piece spool provides accuracy of concentricity in the casing assembly and insures maintenance of reliable seating action.

At the four corners of the blocks through passages at 90° spacings are provided to receive mounting bolts which are anchored to end cap members for clamping the assembled casing parts together. Each block may be rotated in assembling the same so as to face connector passage openings in any one of four directions for convenience in conduit connections.

FIGURES

FIG. 1 is a longitudinal sectional view of a two-way spool valve embodying the modular construction of this invention, the spool member being adapted for a normally open valve condition;

FIG. 2 is a sectional view on line 2—2 of FIG. 1;

FIG. 3 shows another form of spool member adapted to provide a normally closed valve condition in the assembly shown by FIG. 1;

FIG. 4 is a schematic drawing of a four-way valve using the modular construction as illustrated by FIG. 1;

FIG. 5 shows a valve casing similar to that of FIG. 4 and illustrating use of a modified spool member; and FIG. 6 is a view similar to FIGS. 4 and 5 with a spool member of a still further modified form.

DESCRIPTION

Referring to FIG. 1 a spool valve assembly embodying the invention is shown as mounted on a suitable support such as a panel wall 2. Through an opening of wall 2 a threaded mounting stud portion 4 of a front end cap member 6 extends with a locking nut 8 anchoring the assembly to the wall. At the opposite end a rear end cap arrangement is provided by end member 10 and plate 12. Held between the end caps is a body section of the housing here shown together with the end caps as encasing a two-way spool valve structure. This simple valve structure includes a pair of body members 14 of identical modular formation between the end caps.

Each of the body members 14 has a longitudinal bore or passage, preferably cylindrical, which is formed with a central chamber section as at 16 and adjacent the open ends of the passage with aligned valve seating sections of a reduced diameter as at 18. Communicating with each chamber 16 is a radial or lateral passage 20 leading to an outer side wall. In passages 20 are threaded the ends of fluid connector conduits 22. The body members and rear cap members are square in overall outline (FIG. 2) and provided with through passages 24 at each corner in 90° spaced relation about the axis of the valve seating sections. In the passages 24 assembly tie bolts 26 are run for anchoring at threaded inner ends to the front end cap member 6. The outer ends of the bolts are also threaded and tightening nuts 28 are turned against end plate 12 thereby holding the parts together in sealed assembled relation.

Each modular block member 14 is formed with complementary end faces around the open ends of the valve seating sections 18 so as to provide means for a self-aligning end to end assembled engagement with a flexible sealing ring pocketed therebetween. A first end face, as at the right of members 14 in FIG. 1, has an annular projecting flange 30 concentric with the axis of sections 18 and inwardly thereof a recessed annular portion 32 in which an annular groove 34 is cut adjacent flange 30. At the opposite end of members 14 a second end face is formed having an annular stepped recess surrounding the open end of section 18. Axially aligned on this end face with flange 30 of the first end face is a groove shouldered seat 36 in which the flange 30 of the other member is engaged. Inwardly of seat 36 is a recessed surface 38 having an annular groove 40 aligned with groove 34 of the first end face. Between the matching recessed surfaces 32 and 38 and grooves 34 and 40 of the opposed end faces the annular pocket, T-shaped in cross section, encloses a flexible sealing ring 42. The inner rim at the base of the leg of the T normally projects peripherally within the cylindrical projection of the aligned and linked valve seating sections 18 for cooperation with the lands of a spool member after the manner of an O-ring to form a fluid-tight valve closure seat.

In the assembly of FIG. 1 a spool member 50 is encased in the aligned passages of the pair of body members 14 and at the front end extends through cap 6 and outwardly thereof having an actuator knob at 52. At its inner end the spool extends into member 10 and is provided with a socket 54 receiving a spring 56 seated at its other end against end plate 12 in a chamber 58 of the member 10. The spool is thus normally urged towards the fore end into the position shown, a shouldered stem portion at 60 engaging a stop abutment formed by a reduced bore section 62 of front cap 6.

The spool of FIG. 1 has two lands 64 and 66 separated by a reduced neck section 68 which normally, as shown, permits flow of fluid between the chambers 16 and thus a fluid connection between tubular conduits 22. Inward movement of spool 50 against spring 56 will carry land 64 into the valve seating sections 18 between members 14 engaging the T ring and sealing off flow for a typical, manually actuated momentary shut-off operation of a normally open two-way valve. It will be apparent that actuation of spool 50 may, of course, be generated by any suitable mechanical or electrical mechanism for such timed shut off operations as may be desired.

The spool 50' shown by FIG. 3 has lands 64'66' of altered dimensions for a normally closed valve condition in the housing assembly of FIG. 1. It will be apparent that by substituting this spool for spool 50 in FIG. 1 the elongated land 66' will normally be in a sealing position of engagement with the sealing ring between the two body members 14. Further it will also be apparent that when the stem is pressed inwardly to the right the reduced neck section 68' will enter the valve seating sections 18 without the shorter land 64' leaving chamber 16.

Front end cap member 6 is mounted in end to end registering relation with body member 14, the inner face of cap 6 having a formation identical with that of the above described first end face of the body member 14 and with a T-ring seal therebetween. Correspondingly, end member 10 mates with the other body member 14 for a similarly sealed engagement at the opposite end. It will be clear from the above that any number of members 14 may be assembled in end to end relationship in order to provide different body sections to accommodate a variety of spool valve installations. It will also be noted that other forms of end cap members may be utilized as are suitable for mounting and/or other spool valve actuating means.

In FIGS. 4, 5 and 6 examples of an identical four-way valve body casing assembly having specifically different spools are shown. In these examples as shown a series of five identical modular body members 114 are schematically indicated, each being formed as the above described members 14, and assembled side by side or in end to end relation between front and rear cap members similar to the corresponding elements of FIG. 1. For convenience of illustration the radial passages to the sides of members 114 are shown open to the upper and lower casing surfaces. It will be apparent that any one of the passages may in fact be set for conduit connection at any of the other three sides of the housing by rotating the individual block to the 90° interval desired before inserting the tie-bolts, all as may be most convenient for any given installation.

In the example of FIG. 4 a pressure inlet passage is indicated at 122 in the central member 114. In the members 114 adjacent thereto passages 222 and 223 may constitute separate pressure outlets. Passages 322 and 323 of the outer body members provide exhaust or pressure relief passages for the pressure lines 222 and 223, respectively.

In FIG. 4 spool 150 is formed with spaced lands 152 and 153 for controlling the pressure lines 222 and 223. As shown the lands are in a "center" position or a completely shut off condition wherein no pressure can be supplied to either outlet from central member 114. It will be noted also that the opposite ends of these lands are spaced from the sealing sections of the next adjacent body members 114 and thereby each outlet 222, 223 is open to exhaust. Spool 150 has three positions. First, is the centered "shut-off" position as described. Second, the spool may be shifted to the right for land 152 to open pressure inlet 122 to outlet 222 and also simultaneously close off flow between the latter and exhaust 322. It will be apparent that the spool, when moved to the right, will maintain land 153 in sealing relation between inlet 122 and outlet 223. In a third position the spool may be shifted to the left of center. This connects pressure inlet 122 and outlet 223, shuts off the relief passage between the latter and exhaust 323, and maintains land 152 in sealing relation between inlet 122 and outlet 222.

In FIG. 5 the same body housing structure of assembled modular elements is used. Here, spool 250, however, has a land 253 of greater length than the corresponding land 153 of FIG. 4. At its left hand end land 253 in the "center" position shown seals off communication between pressure outlet 223 and exhaust passage 323 as well as communication with inlet 122. This arrangement may be used, for example, where it is desired that pressure be maintained in one outlet line, as the passage 223, unless and until pressure is supplied to the other outlet passage 222. A center position is shown and it may be assumed at the start of a cycle of operation that outlet 223 is under stored pressure conditions, outlet 222 being open to exhaust 322. By shifting the spool to the right pressure is supplied to outlet 222 and relieved from outlet 223 by reason of opening the connection to exhaust passage 323. When a desired effect of pressure conditions in outlet 222 is accomplished the spool may then be moved to the left and beyond the position shown so as to exhaust pressure from outlet 222 and again admit pressure to outlet 223 after which the spool may be returned to center position and return to the conditions of a stored pressure in outlet 223 as at the start of the assumed cycle.

In the arrangement of FIG. 6 the same modular housing assembly is shown with spool member 350 having a land 353 in a "centered" position which is displaced to the left as compared with land 153 of FIG. 4. In such position inlet 122 is connected to outlet 223 and supplies pressure thereto. Movement of spool 350 as to the right first supplies pressure to outlet 222 and shuts off exhaust 322, while continuing to maintain a supply of pressure to outlet 223. When the effect of pressure in both outlets achieves a desired result the spool may be moved further to the right to exhaust outlet 223 and retain the pressure in outlet 222 until a return to the "centered" position and conditions at the start of the cycle is again desired.

As will be appreciated the spools utilized in the described assembly of modular body members are of a one piece construction and thus will be of a balanced construction in which a high degree of concentricity may be maintained in order to perform satisfactorily under conditions of high pressure loads as above referred to. The construction shown further allows a change in valve operation merely by changing to a spool of modified configuration as in the examples above described. Such change may also be accomplished without taking an entire valve apart as it will be obvious that removal of one end cap permits the slidable endwise withdrawal of one spool and insertion of another and without taking down and reassembling all parts. Merely by changing the length of the spool lands the present valve construction will permit the opening of one passage before another as, for example, to drop one load before a second, or this feature can be used to prevent drift in a valve system as will be understood by those skilled in the art.

The disclosed mating end face configurations of the modular elements as described is not only of advantage in an initial "piloted" nesting assembly without fixtures but further the end face design enables production of the entire sealing cavity and valve seating bore with a single power tool, thus obtaining a concentricity of surfaces important for handling high pressure loads.

What is claimed is:

1. A spool valve for high pressure fluid distribution comprising
    interchangeable valve body members and housing end cap members holding said body members therebetween in a stacked end to end assembly,
    each body member having a longitudinal passage formed with a central valve chamber and longitudinally aligned cylindrical valve seating sections at the ends thereof, a conduit connector passage extending laterally between said chamber and an outer side wall of the member, and first and second end faces,
    said first end face having an annular flange concentric with the valve seating sections and inwardly of the flange provided with a recessed concentric annular groove,
    said second end face having a recessed annular seat and groove inwardly thereof longitudinally aligned, respectively, with the flange and groove of the first end face,
    the flange and seat of first and second end faces, respectively, of adjoining body members being interengaged and holding the valve seating sections thereof axially aligned, and a flexible ring seal pocketed between adjoining sections by said annular grooves of said engaged end faces, and
    a movable spool member extending through the longitudinal passages of said body members having a land portion thereof movable to and from valve seating relation with said pocketed ring seal.

2. The structure of claim 1, in which,
    the housing end cap members have first and second end faces interengaged with the end faces of the assembled body members, and ring seals therebetween form fluid tight end sealing seats engaged by the spool member at said ends.

3. The structure of claim 1, in which,
    said ring seals are T-shaped in cross section and said concentric annular grooves of the end faces are adjacent said flange and said seat in spaced relation to the end openings of adjoining valve seat sections.

4. The structure of claim 3, in which,
    said body members are square in overall cross sectional outline, and longitudinal through passages are provided at the corners thereof at 90° spaced intervals with tie bolts, anchored to said housing end members, extending through said passages.

5. A modular spool valve body member for stacking a plurality of identical members in end to end assembled relation between end cap elements and encasing a movable spool member for high pressure fluid distribution,
    said body member having
    a longitudinal passage therethrough provided with aligned cylindrical bores at each end defining spool seating sections, and, between said end bores a central chamber and a conduit passage laterally connecting the chamber with an outside wall of said body,
    said member having a first end face with a projecting annular flange and inwardly thereof a recessed surface, each concentrically surrounding the adjacent bore opening, and the other end face having a recessed annular flange seat aligned with said flange and a recessed surface matching said recessed surface of the first end face, and
    longitudinal tie-bolt openings at the corners of said members at 90° spaced intervals about the axis of said seating sections for rotative selection of the angular direction of said lateral conduit passage in assembling a plurality of like modular members in end to end relation, the first and second end faces of a pair of modular members being adapted for a self-aligning interengagement of said members by seating said flange on said flange seat and the pocketing in the spacing between opposed recessed surfaces of a flexible sealing ring.

6. The structure of claim 5, in which,
said recessed surfaces of the first and second end faces are provided with longitudinally aligned grooves in spaced relation to the bore openings for receiving a sealing ring of T-shaped cross section between a pair of engaged members.

* * * * *